Nov. 20, 1951     D. S. GREY     2,576,011
CATADIOPTRIC OPTICAL SYSTEM
Filed July 11, 1950

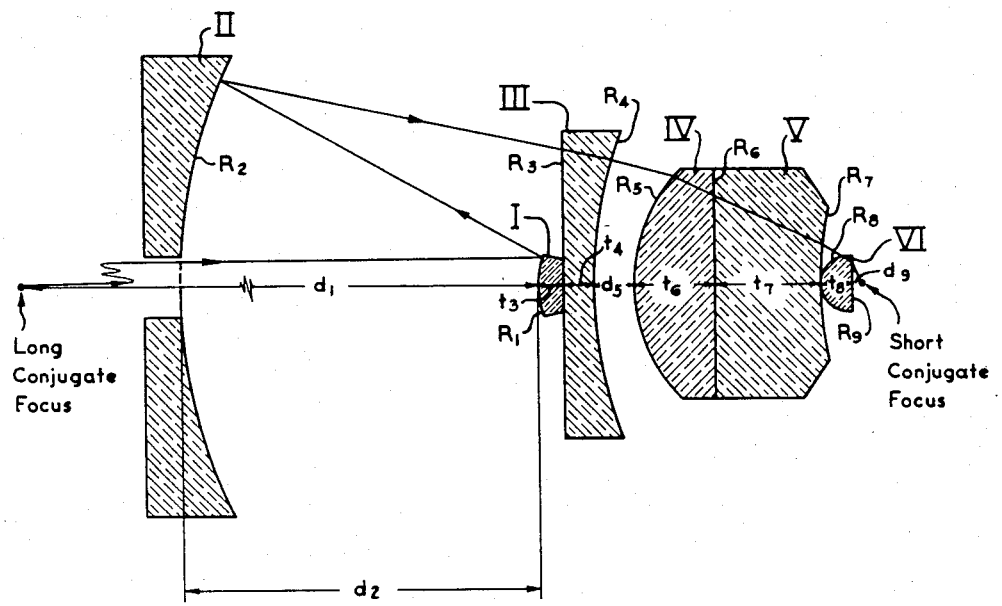

| COMPONENT | RADIUS | THICKNESS | MATERIAL |
|---|---|---|---|
| MIRROR I | $R_1 = 5.70$ | $d_1 = 120.0$ | |
| MIRROR II | $R_2 = 33.60$ | $d_2 = 23.760$ | |
| LENS III | $R_3 = \infty$ | $t_3 = 1.600$ | Fused Quartz |
| | $R_4 = 27.50$ | $t_4 = 2.000$ | |
| LENS IV | $R_5 = 10.50$ | $d_5 = 2.600$ | Calcium Fluoride |
| | $R_6 = \infty$ | $t_6 = 5.363$ | |
| LENS V | $R_6 = \infty$ | $t_7 = 7.104$ | Fused Quartz |
| | $R_7 = 22.98$ | | |
| LENS VI | $R_8 = 1.80$ | $t_8 = 2.060$ | Fused Quartz |
| | $R_9 = \infty$ | $d_9 = 0.80$ | |

David S. Grey
INVENTOR

BY Donald L. Brown
and
Moncure B. Berg
ATTORNEYS

Patented Nov. 20, 1951

2,576,011

UNITED STATES PATENT OFFICE 2,576,011

CATADIOPTRIC OPTICAL SYSTEM

David S. Grey, Weston, Mass., assignor to Polaroid Corporation, Cambridge, Mass., a corporation of Delaware Application July 11, 1950, Serial No. 173,209

7 Claims. (Cl. 88—57)

1

This invention relates to optical systems and more particularly has reference to systems useful in the fields of microscopy, photography and projection.

Objects of this invention are to provide an improved catadioptric system having an exceptionally small obscuring ratio and a large numerical aperture, and to provide a system of this character especially designed for use as a microscope condenser having an obscuring ratio of about 4% and a numerical aperture as high as 1.3.

Further objects of the invention are the provision of optical systems of the character described which are well corrected throughout the region of the electromagnetic spectrum ranging from the medium ultraviolet into the infrared and which comprise a plurality of optically aligned catoptric components and, in optical alignment therewith, a plurality of dioptric components corrected for spherical aberration and coma for differences in index of refraction caused by changes in refractive index of the order of 0.07 in accordance with variation of the wavelength of light throughout said wavelength range, while maintaining the position of the conjugate foci substantially constant and providing a system having low obscuring ratio and a numerical aperture at least as great as 0.72, and also the provision of a system of the nature set forth wherein said catoptric components comprise a pair of mirrors having spherical reflecting surfaces and said dioptric components comprise refractive lenses having spherical refracting surfaces.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed disclosure taken in connection with the single accompanying illustration which diagrammatically shows, in section, one embodiment of an optical system forming the subject of this invention and especially adapted for use as a microscope condenser.

In my copending application Serial No. 55,588, filed October 20, 1948, now Patent No. 2,520,633 dated August 29, 1950, for Optical Systems, there is disclosed a system comprising a plurality of optically aligned dioptric components and, in optical alignment therewith, a plurality of catoptric components. The system of my copending application locates a convex mirror in close proximity to one of the refractive elements thereof.

2

This arrangement causes a small central portion of the refractive surface closest to said convex mirror element to be obscured for the passage of light through said refractive surface. A system having an obscuring ratio of a value of from 10% to somewhat less is provided by the optical design shown in my copending application.

The present invention, while making use of a plurality of catoptric and dioptric components mounted in a manner similar to that described, is so designed that it provides an optical system having an extremely low obscuring ratio, and specifically a system wherein the convex mirror thereof obscures not more than approximately 4% of light incident on that refractive surface of the system which is closest to the convex mirror thereof. The optical system described herein is especially suited for use as a microscope condenser but with some slight modifications, which will hereinafter be mentioned, is usable as a microscope objective, a photographic objective, a projection objective, or the like.

With reference to the drawing, one embodiment of the condenser lens system for transmitting ultraviolet light is shown as comprising a plurality of catoptric components I and II and a plurality of dioptric components or refractive lenses III, IV, V and VI. It is to be noted that all reflecting and refracting surfaces employed are spherical surfaces.

The catoptric components comprise a convex mirror I and a concave mirror II. Mirror element I has a continuous convex reflecting surface. Mirror element II is provided with an opening extending centrally therethrough and has a continuous concave reflecting surface in surrounding relation to said opening. The reflecting surface of the mirror element II is positioned to face the convex surface of mirror I and also the short conjugate focus of the objective. Both mirrors I and II are located on the side of the dioptric components which includes the long conjugate focus of the objective. Mirror element I is adapted to be closely positioned to that refractive surface of the dioptric components which is most distantly located from the short conjugate focus. Conveniently, for this purpose, mirror element I may be mounted directly on that surface of the refractive lens III which has the radius $R_3$. To simplify the fabrication of the concave mirror II, an opening need not actually be formed therethrough. Instead, mirror II may be formed of a material transparent to the wavelength region to be passed by the system and may be provided with an optical surface on both faces, with the concave face thereof having an annular shaped area which is reflection-coated to provide a centrally located, uncoated area around the optical axis.

With regard to the dioptric components, lens element III may preferably comprise a simple plano-concave lens. Lens elements IV and V are shown in the form of a doublet which provides a meniscus, although, as will subsequently appear, this doublet may be shaped to provide a biconvex component. Lens element VI is a heispherical type lens, either a hemisphere or a hyperhemisphere and is shown as positioned in contact with the surface of element V closest to the short conjugate focus.

In the drawing the full line with arrows thereon illustrates the path direction of light traversing the condenser from the long conjugate focus thereof to the short conjugate focus and traces a marginal axial ray through the condenser.

The dioptric components III, IV, and VI are formed of optical media which are capable of transmitting ultraviolet radiation, visable light, and near infrared radiation. Examples of materials of this character are calcium fluoride, lithium fluoride, fused quartz, crystal quartz, sodium chloride, potassium bromide, β-magnesium oxide, potassium chloride, and the like. Of these materials, fused quartz and substantially pure or artificially grown crystals of calcium fluoride may be named as preferred. Materials of the character just noted are capable of transmitting light throughout a wavelength range of from below 2200Å. to beyond 6000Å, the wavelength range for which the objective is corrected.

The reflecting surfaces for the catoptric components of the condenser are preferably coated with aluminum. Other materials may, however, be employed, such, for example, as silver and the like, to provide reflection coatings.

Table 1 below gives the constructional data, with dimensions in millimeters, for the specific example of the lens system illustrated in the figure.

Table 1

| Component | Radius | Thickness | Material |
|---|---|---|---|
| Mirror I | $R_1=5.70$ | $d_1=120.0$ | |
| Mirror II | $R_2=33.60$ | $d_2=23.760$ | |
| Lens III | $R_3=\infty$ | $t_3=1.600$ | Fused Quartz. |
| | $R_4=27.50$ | $t_4=2.000$ | |
| Lens IV | $R_5=10.50$ | $d_5=2.600$ | Calcium Fluoride. |
| | $R_6=\infty$ | $t_6=5.363$ | |
| Lens V | $R_6=\infty$ | $t_7=7.104$ | Fused Quartz. |
| | $R_7=22.98$ | | |
| Lens VI | $R_8=1.80$ | $t_8=2.060$ | Do. |
| | $R_9=\infty$ | $d_9=0.80$ | |

Table 2 below gives representative ultraviolet indices of the preferred materials. These indices were computed by least square curve fitting from values in the International Critical Table. The values for the crystal quartz are for the ordinary ray.

Table 2—Refractive index (n)

| Wavelength | Calcium Fluoride | Fused Quartz | Crystal Quartz |
|---|---|---|---|
| Å | | | |
| 2200 | 1.48111 | 1.52861 | 1.62442 |
| 2400 | 1.47123 | 1.51347 | 1.60724 |
| 2700 | 1.46093 | 1.49811 | 1.58973 |
| 3200 | 1.45057 | 1.48282 | 1.57224 |
| 4000 | 1.44187 | 1.47022 | 1.55774 |

In the type of optical system disclosed herein both the catoptric components and the dioptric components are only partially corrected for optical aberrations. However, the partial correction in one set of components is designed to compensate the aberrations in the other set of components.

Thus the mirror combination of the condenser possesses under-corrected aberrations which are adapted to be corrected by the dioptric components III through VI acting as a unit. In general, the dioptric components III through VI may be divided into three lens groups.

The plano-concave element III constitutes one of these groups and is designed to contribute a large amount of overcorrected spherical aberration to the system as a whole. In general, this overcorrected spherical aberration in the lens III is used to substantially compensate for the undercorrected spherical aberration possessed by the mirrors I and II. It is also found preferable that the surface of the compound lens IV, V located nearest to the short conjugate focus have large undercorrected spherical aberration. Primarily, this just mentioned undercorrected spherical aberration of the compound lens is also compensated by the lens III.

The second group of dioptric components comprises the lenses IV and V shown as a doublet in the form of a thick meniscus. If desired, the doublet may be biconvex in shape instead of in meniscus form. Preferably, the doublet IV, V is partially achromatized although chromatic aberration could be completely corrected by lens III of the first lens group.

The third lens group comprises the hemispherical type element VI. Element VI may be a hemisphere or, as shown, may be a hyperhemisphere. The hyperhemisphere VI is located so that the short conjugate focus of the condenser system is approximately at the Amici point of the element VI itself. By the Amici point, I mean the object point for which there is no spherical aberration or coma and for which the angle of incidence is not normal. Preferably, lens VI is so located that the short conjugate of the objective lies between the Amici point and the center of curvature of the hyperhemisphere, to thus reduce the variation of coma with wavelength which necessarily attends Amici point construction.

An advantage of the large amount of overcorrected spherical aberration introduced by the first noted lens group, namely lens III, permits an arrangement of mirrors which has a low obscuring ratio. Furthermore, a lens in the position of lens III, which gives large overcorrected spherical aberration, also gives large overcorrected chromatic aberration. This large overcorrected chromatic aberration overcomes chromatic undercorrection in the lens elements of the second and third lens groups, namely lenses IV, V and VI. The dioptric components may be taken together as a unit which acts as a positive lens since the paraxial incident height at the compound lens IV, V and at lens VI, which give chromatic undercorrection, will be much smaller than at the lens element III, which latter gives chromatic overcorrection. In fact, in the system forming the subject of this invention, the numerical aperture of the entire system, including the mirrors and the lenses, is approximately three times the numerical aperture of the mirrors taken alone.

The secondary spectrum arising from the large surface separation of the refractive lens groups is anomalous in sign, i. e., the extremes of a spectral interval come to focus closer to the principal points of the condenser system than the middle of the spectral interval. This anomalous secondary spectrum may be overcome by partial achromatization in the ordinary sense, i. e., by the use of elements using refractive media of high and low dispersion values.

A ratio of paraxial incident height at the concave mirror to the paraxial incident height at the convex mirror, for a system adapted to have a low obscuring ratio and such as that forming the subject of this invention, will be much greater than the paraxial incident height ratio for a system which has a larger obscuring ratio. For example, the objective system of my copending application has a paraxial incident height ratio of about 5.0 and an obscuring ratio of about 10%. In the present case, the paraxial incident height ratio is about 9.5, that is to say, the mirrors I and II are spaced apart by a distance selected to provide a paraxial incident height on the reflecting surface of the concave mirror which is approximately 9.5 times greater than the paraxial incident height on the reflecting surface of the convex mirror. This specific value of 9.5 in regard to paraxial incident height is not critical but indicates the order of magnification that the paraxial incident height must attain to obtain obscuring ratios of about 4% in a system of this character, which has a numerical aperture up to about 1.3.

The system herein set forth, as previously indicated, has been specifically computed for use as a condenser for an ultraviolet microscope. It is desired that for this condenser the various aberrations, such as spherical aberration, chromatic aberration and coma, should be extremely small. The reason for this is that the aberration residual in the condenser will detract from the image area, which should be completely and uniformly illuminated. Ordinarily, a small loss in the well illuminated image area would not be considered serious. However, the condenser of the present invention is adapted to be illuminated by an ultraviolet monochromator and any loss of image area due to condenser aberrations implies a corresponding increase in the size of the monochromator to achieve satisfactory results.

If the complete system illustrated were to be used as an objective, zonal aberrations of the character just noted would have to be made smaller, as for example by balancing residual aberrations for a somewhat reduced numerical aperture of the optical system, say a numerical aperture of 1.1 or 1.15 or thereabouts. While such an expedient is possible, it is not always desirable for the reason that it is considered unnecessary in an objective to realize such a small obscuring ratio as the previously mentioned obscuring ratio of 4%. A somewhat larger obscuring ratio for an objective will yield a somewhat more satisfactory objective design.

It is desirable to design a condenser with as small an obscuring ratio as possible for reasons of economy so that the condenser can work at more than one numerical aperture. If, for example, the obscuring ratio is 10% in area when used at a numerical aperture of 1.30, which is the numerical aperture of the condenser design of this invention, the obscuring ratio would be 34% in area when the same condenser is used at a numerical aperture of 0.7. This is because the physical size of a convex or obscuring mirror such as the mirror I cannot be changed as the numerical aperture of the condenser is varied under different conditions of use to obtain different types of illumination. In the condenser of this invention having an obscuring ratio of about 4%, reduction from the full numerical aperture of 1.30 to a numerical aperture of about 0.7 results in giving an obscuring ratio of about 14% in area. The 14% obscuring ratio just noted is considered satisfactory for use with an objective which itself has an obscuring ratio of about 9%.

The plano-concave refractive lens III is preferably shaped as illustrated with one side approximately plano and the other side having a radius which permits transmission of light at approximately normal incidence to the curved side. It becomes increasingly difficult to compensate a low obscuring mirror system if the plano surface of the lens III becomes convex, although such compensation is not impossible. Also, the radii, spacings and centering tolerances for the lens III become increasingly more critical if the plano surface becomes concave. The plano configuration for the surface of the lens III which supports the mirror I is selected as a compromise between ease of design and convenience in manufacture.

It is to be noted that the refractive components which are illustrated are adapted to provide a large fraction of the converging power of the system when the radius of curvature of the side of the lens III nearest to the short conjugate focus is selected to provide for approximately normal incidence. It becomes difficult to provide as large a fraction of the converging power of the system through the refracting elements in instances wherein the radius of curvature of the concave side of the element III is made greater than that necessary for normal incidence. On the other hand, if this radius of curvature is made shorter than that necessary for approximately normal incidence, the variation of focal length with wavelength, i. e., variation of magnification with wavelength, tends to become larger than that of the system illustrated herein. It should further be understood that if the surface of the lens III closest to the convex mirror departs from its plano form, the more steeply curved surface should similarly be altered so that the net power of lens III is as prescribed by the plano-normal incidence configuration.

More or less major modifications of the cemented doublet IV, V are possible. This doublet is required, as intimated, to remove secondary spectrum and further is employed to compensate third order spherical aberration and coma residual in the remainder of the system, i. e., the mirrors I and II and the refracting elements III and VI. As it will be understood by the art, compensation for these purposes will permit considerable variation in a lens element equivalent to the doublet IV, V, both in the shaping of said element and in the spacing thereof.

Variation of the lenses III and VI are restricted to the rather specific limitations previously described.

One point to be noted is the fact that the mirror elements I and II are completely determined or defined if the obscuring ratio and the paraxial incident height therefor is given or known.

In the system forming the subject of this invention, the refractive components not only compensate the aberrations of the mirrors at one wavelength of incident radiation but possess a stability of correction over a large wavelength interval. Thus, the refractive components herein are arranged so that the correction is stable for changes in index of about 0.07 in accordance with variation of the wavelength of light throughout the wavelength range of the system while maintaining the position of the conjugate foci substantially constant. It is possible to perform the elimination of change in aberration with wavelength by the use of only one refractive material but, if as in the design illustrated, a large amount of converging power is contributed by the refractive components, it is desirable and almost essential that two lens materials of different dispersions be employed.

The system illustrated in the drawing is computed specifically for use as a microscope condenser and is designed for employment with a slide thickness of 0.5 mm. The slide is adapted to be "oiled" to hemisphere VI with a suitable immersion liquid comprising glycerine, sugar and water. The condenser disclosed has an effective focal length of 1.6 and a numerical aperture of 1.30, and is corrected for slide thickness of 0.5 mm. and a thickness for immersion liquid of 0.3 mm. with liquid of the character noted above. The system as shown is corrected for a slide whose refractive index is similar to that of the hemispherical element.

While fused quartz is illustrated as the refractive material for lenses III, V and VI, the invention may be carried out with crystal quartz. Crystal quartz, however, is objectionable from the standpoint that it cannot be used with polarized light. On the other hand, if elements III and V are of crystal quartz, a larger radius for the hemisphere may be achieved. It is usually not desirable to use crystal quartz for the hemisphere itself because the very steep inclination of rays in this element will lead to rather large birefringence effects. One advantage in the use of crystal quartz resides in the fact that carefully selected crystal quartz is more transparent to ultraviolet radiation than fused quartz.

While specifically disclosed by way of illustration for use as a microscope condenser, it will be appreciated that the invention is particularly useful as a photographic objective and a projection objective and may also be used as a microscope objective. Should it be desirable to use the system of this invention as a microscope objective, it becomes necessary to rebalance the zonal aberrations of the system illustrated for a numerical aperture slightly reduced below that mentioned. For other uses of the system, such as those previously noted, it might be desired to alter the long conjugate focal distance for which the condenser is corrected by bending the components in the manner heretofore set forth in this application, as will be well understood to the art. A method of great convenience in altering the long conjugate focal distance for which the system is corrected has been found to consist merely of a minute change in the spacing between the convex and concave reflecting surfaces. The spherical aberration may, by this means, be adjusted over a large range of magnifications. The coma correction remains essentially complete.

While the optical system of the invention has been shown in conjunction with optical media which transmit ultraviolet, visible and near infrared radiations, it is to be understood that the designs set forth may be carried out with other optical materials which, however, have a transmission over a more limited wavelength range. For example, the systems disclosed herein are well adapted to be carried out with optical media which will not transmit ultarviolet radiations but will transmit visible light, as for example, glass and the like.

From the foregoing it may be observed that in accordance with the teaching set forth, I have fulfilled the objects and novel aims of my invention and have provided novel and improved optical systems for the various uses noted herein.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A lens system providing a microscope condenser, a microscope objective, a photographic objective, a projection objective and the like, which is corrected for spherical aberration and coma for differences in index of refraction caused by changes in refractive index of the order of 0.07 in accordance with variation of the wavelength of light throughout a wavelength range extending from within the medium ultaviolet region of the spectrum to within the infrared region of the spectrum, while maintaining the position of the conjugate foci of said objective substantially constant for wavelengths within said range, said objective comprising a plurality of optically aligned catoptric components which have substantially spherical surfaces and which are at least partially uncorrected for optical aberrations and, in optical alignment therewith, a plurality of dioptric components which have substantially spherical surfaces and which are also at least partially uncorrected for optical aberrations and which are located on the side of the catoptric components that includes the short conjugate focus of said objective, said catoptric components comprising a concave mirror having a concave reflecting surface and a convex mirror having a convex reflecting surface, said concave mirror being provided with an opening extending centrally therethrough and having said concave reflecting surface in surrounding relation to said opening, said concave mirror being positioned to have the reflecting surface thereof facing said dioptric components and said convex mirror being positioned to have the reflecting surface thereof facing said concave reflecting surface, and said dioptric components comprising a substantially plano-concave lens which contributes overcorrected spherical aberration to the system and which is located closely adjacent said convex mirror, a compound lens, which is at least partially achromatized and which increases the convergence of the system, spaced from said plano-concave lens on the short conjugate side of said plano-concave lens, and a hemispherical type lens located on the short conjugate side of said compound lens and having its plane surface positioned substantially at the short conjugate focus of the system whereby the short conjugate focus is located approximately at the Amici point of said hemispherical type lens.

2. A lens system as defined in claim 1 wherein said hemispherical type lens is positioned so that the short conjugate focus of the system is located between the center of curvature of said hemispherical type lens and the interior aplanatic point of said lens.

3. A lens system providing a microscope condenser, a microscope objective, a photographic objective, a projection objective and the like, which is corrected for spherical aberration and coma for differences in index of refraction caused by changes in refractive index of the order of 0.07 in accordance with variation of the wavelength of light throughout a wavelength range extending from within the medium ultraviolet region of the spectrum to within the infrared region of the spectrum, while maintaining the position of the conjungate foci of said objective substantially constant for wave lengths within said range, said objective comprising a plurality of optically aligned catoptric components which are at least partially uncorrected for optical aberrations and, in optical alignment therewith, a plurality of dioptric components which are also at least partially uncorrected for optical aberrations and which are located on the side of the catoptric components that includes the short conjugate focus of said objective, said catoptric components comprising a concave mirror having a concave reflecting surface and a convex mirror having a convex reflecting surface, both said reflecting surfaces being substantially spherical, said concave mirror being provided with an opening extending centrally therethrough and having said concave reflecting surface in surrounding relation to said opening, said concave mirror being positioned to have the reflecting surface thereof facing said dioptric components and said convex mirror being positioned to have the reflecting surface thereof facing said concave reflecting surface and being located closely adjacent that refractive surface of said dioptric components most distant from said short conjugate focus, said mirrors together being spherically undercorrected and being spaced apart by a distance selected to provide a paraxial incident height on the reflecting surface of said concave mirror which is approximately 9.5 times greater than the paraxial incident height on the reflecting surface of said convex mirror, and said dioptric components comprising a negative lens, a thick positive meniscus lens and a hemispherical type lens, said lenses having refracting surfaces of a spherical character and together acting as a group to provide a strong positive lens which is overcorrected for spherical aberration by an amount substantially equal to the spherical undercorrection of said mirrors.

4. A lens system as defined in claim 3 wherein said convex mirror is supported on that refractive surface of said dioptric components which is located most distant from the short conjugate focus of said system.

5. A lens system as defined in claim 3, wherein said convex mirror is mounted upon that refractive surface of said dioptric components which is located most distant from said short conjungate focus and wherein said convex mirror obscures not more than approximately 4% of light incident on said refractive surface.

6. A lens system as defined in claim 1 wherein said concave and convex mirrors are undercorrected for spherical aberration and wherein said plano-concave lens is overcorrected for spherical aberration by an amount which is less than the undercorrection for spherical aberration of said mirrors.

7. A lens system as defined in claim 1 wherein said concave and convex mirrors are undercorrected for spherical aberration and wherein said plano-concave lens is overcorrected for spherical aberration by an amount which is less than the undercorrection for spherical aberration of said mirrors and wherein the remaining undercorrected spherical aberration of said mirrors is corrected by said compound lens and said hemispherical lens acting together.

DAVID S. GREY.

REFERENCES CITED

The following references are of record in the file of this patent:

UNITED STATES PATENTS

| Number | Name | Date |
| --- | --- | --- |
| 2,141,884 | Sonnefeld | Dec. 27, 1938 |
| 2,198,014 | Ott | Apr. 23, 1940 |
| 2,206,155 | Boegehold | July 2, 1940 |
| 2,324,081 | Herzberger | July 13, 1943 |
| 2,380,887 | Warmisham | July 31, 1945 |
| 2,380,888 | Warmisham | July 31, 1945 |
| 2,413,286 | Buchele | Dec. 31, 1946 |

FOREIGN PATENTS

| Number | Country | Date |
| --- | --- | --- |
| 82,671 | Germany | Aug. 7, 1895 |
| 544,694 | Great Britain | Apr. 23, 1942 |